(12) United States Patent
Sizikov et al.

(10) Patent No.: US 9,709,197 B2
(45) Date of Patent: Jul. 18, 2017

(54) VARIABLE STRUCTURE SEALS

(71) Applicant: EMIGAL ELECTRONIC TEST SOLUTIONS LTD., Doar-Na Menashe (IL)

(72) Inventors: Vladimir Sizikov, Doar-Na Menashe (IL); Viktor Dubovsky, Hadera (IL)

(73) Assignee: EMIGAL ELECTRONIC TEST SOLUTIONS LTD., Doar-Na Menashe (IL)

( * ) Notice: Subject to any disclaimer, the term of this patent is extended or adjusted under 35 U.S.C. 154(b) by 0 days.

(21) Appl. No.: 14/399,221

(22) PCT Filed: May 7, 2013

(86) PCT No.: PCT/IL2013/050388
§ 371 (c)(1),
(2) Date: Nov. 6, 2014

(87) PCT Pub. No.: WO2013/168153
PCT Pub. Date: Nov. 14, 2013

(65) Prior Publication Data
US 2015/0084330 A1    Mar. 26, 2015

Related U.S. Application Data

(60) Provisional application No. 61/643,394, filed on May 7, 2012.

(51) Int. Cl.
*F16L 17/10*    (2006.01)
*F16J 15/46*    (2006.01)
*F16L 27/093*   (2006.01)
*F16L 37/62*    (2006.01)
*F16L 25/14*    (2006.01)

(52) U.S. Cl.
CPC ............... *F16L 17/10* (2013.01); *F16J 15/46* (2013.01); *F16L 25/14* (2013.01); *F16L 27/093* (2013.01); *F16L 37/62* (2013.01); *F16L 2201/30* (2013.01); *Y10T 29/49764* (2015.01)

(58) Field of Classification Search
CPC .. F16L 17/10; F16L 37/62; F16J 15/46; E21B 33/04; E21B 33/005
See application file for complete search history.

(56) References Cited

U.S. PATENT DOCUMENTS 3,147,015 A    9/1964  Hanback
3,383,125 A *  5/1968  Stanley ................. F16L 27/12
                                                    277/616

(Continued)

FOREIGN PATENT DOCUMENTS

DE    8712070 U1    1/1989
FR    1523724 A     5/1968

(Continued)

*Primary Examiner* — Kristina Fulton
*Assistant Examiner* — Eugene G Byrd
(74) *Attorney, Agent, or Firm* — Roach Brown McCarthy & Gruber, P.C.; Kevin D. McCarthy

(57) ABSTRACT

A seal (100) for connecting to a tube (110) having a wall, the seal comprising: • an elongated cavity (130) for receiving an end of the tube (110); • a first elastic ring (140) in the cavity (130); and • a fluid inlet (150) for radially pressing the first elastic ring (140) against the wall of the tube (110) inserted in the cavity (130).

12 Claims, 12 Drawing Sheets

(56) References Cited

U.S. PATENT DOCUMENTS

| | | | |
|---|---|---|---|
| 3,844,313 A | 10/1974 | Arnold | |
| 3,874,706 A * | 4/1975 | Arnold | F16L 19/08 |
| | | | 285/105 |
| 3,944,263 A * | 3/1976 | Arnold | F16L 17/10 |
| | | | 285/106 |
| 4,448,425 A * | 5/1984 | von Bergen | B63H 23/321 |
| | | | 277/320 |
| 4,527,817 A * | 7/1985 | Persson | F16L 25/14 |
| | | | 285/101 |
| 4,585,256 A | 4/1986 | Rassieur et al. | |
| 4,676,531 A * | 6/1987 | Martin | F16L 17/10 |
| | | | 285/226 |
| 5,180,008 A * | 1/1993 | Aldridge | E21B 33/03 |
| | | | 166/84.1 |
| 5,232,021 A * | 8/1993 | Smith | E21B 33/0355 |
| | | | 137/614.04 |
| 8,827,275 B2 * | 9/2014 | Heinrich | F16J 15/004 |
| | | | 277/353 |
| 2005/0046180 A1 | 3/2005 | Tombler et al. | |

FOREIGN PATENT DOCUMENTS

| | | | |
|---|---|---|---|
| GB | 2006351 A | 5/1979 | |
| GB | 2291483 A | 1/1996 | |
| WO | 9411657 A1 | 5/1994 | |
| WO | 03087646 A1 | 10/2003 | |

\* cited by examiner

VARIABLE STRUCTURE SEALS

FIELD AND BACKGROUND OF THE INVENTION

The present invention, in some embodiments thereof, relates to a seal for connecting two tubes or for checking the connection between two tubes.

U.S. Pat. No. 7,478,838 to McBee et al. describes a fitting for sealing against the inner surface of an inlet, including an elongated mandrel and one or more resilient bushings supported on the mandrel. The fitting has a first condition wherein the resilient bushing can be received within the inlet. The fitting can be actuated to a second condition where the resilient bushing expands radially to sealingly engage the inner surface of the inlet. When the inlet is sealingly engaged by the resilient bushing in the second condition, fluid may be admitted to the inlet through an axial bore in the mandrel. When the fitting is used to fill a pipe system, fluid supplied to the inlet may be pressurized to facilitate monitoring the pipe system for leaks. The fitting may include a sealing member configured to seal against a terminal end of the inlet when the bushing is radially expanded to seal against the inner surface of the inlet in the second condition.

U.S. Pat. No. 7,591,484 to McBee et al. describes a fitting for sealing against the outer surface of an inlet including a housing comprising a base and a closure defining a cavity within the housing. A resilient bushing is disposed within the cavity and is positioned between the closure and a piston slideably disposed in the cavity. The fitting has a first condition in which the inlet can be received within an inner diameter of the bushing through an aperture in the closure. The fitting can be actuated to a second condition in which the piston axially compresses the resilient bushing against the closure, thereby causing the inner diameter of the bushing to expand radially inwardly to sealingly engage the outer surface of the inlet. When the inlet is sealingly engaged by the resilient bushing in the second condition, fluid may be admitted to the inlet through a fluid passage in the housing.

U.S. Pat. No. 7,648,177 to Tombler Jr. et al. describes a method and apparatus for tight sealing between a first space and a second space. The second space is at least partially enclosed by a member. The method or apparatus includes or performs the step of creating or maintaining a pressure difference between a pressure in a third space at a seal assembly and pressure in each of the first space and the second space; and pushing, caused by the pressure difference, against a seal in the seal assembly to tighten sealing provided by the seal.

SUMMARY OF THE INVENTION

An aspect of some embodiments of the invention relates to a seal for connection of two tubes, where the seal comprises at least one elastic ring, such as an o-ring, which is radially pressed against a tube by fluid (gas or liquid) pressure. In some embodiments, the seal comprises two o-rings surrounding a tube, wherein an outer o-ring is radially pressed against an inner o-ring by fluid pressure, causing the inner ring to be radially pressed against a tube.

An aspect of some embodiments of the invention relates to a seal (or connector) for connecting two tubes, at least one of the tubes made of a flexible material. In some embodiments the connector comprises two elastic rings which are pressed against a tube from opposite directions. At least one of the rings is preferably pressed by a fluid (gas or liquid) pressure.

An aspect of some embodiments of the invention relates to a seal (or connector) for connecting two tubes, wherein at least one of the tubes is rotating during connection to the seal. In some embodiments, the rotating tube may be rotating while inserted into the seal and sealing the connection, in addition to rotating when the connection is sealed.

In some embodiments the rotating tube comprises a plurality of holes aligned at a same circumference and the connector comprises two o-rings surrounding the tube from opposite sides of the plurality of holes, the o-rings adapted to be pressed, by fluid pressure, against the rotating tube. The seal further comprises a connection for a stationary tube aligned with the plurality of holes of the rotating tube.

An aspect of some embodiments of the invention relates to a seal for blocking flow from one tube to another.

An aspect of some embodiments relates to a seal for checking the quality of a connection between two tubes, the seal comprising at least one elastic ring which is radially pressed against a tube or connector by fluid (gas or liquid) pressure.

According to an aspect of some embodiments of the present invention there is provided a seal for connecting to a tube having a wall, the seal comprising:
an elongated cavity for receiving an end of a tube;
a first elastic ring in the cavity; and
a fluid inlet for radially pressing the first elastic ring against the wall of the tube inserted in the cavity.

According to some embodiments of the invention, the first elastic ring is adapted to deform and fill an area between the tube and walls of the cavity when radially pressed.

According to some embodiments of the invention, the first elastic ring has a different shape than the cross-section of the tube.

According to some embodiments of the invention, the first elastic ring has a different shape than the cross-section of the cavity.

According to some embodiments of the invention, the cross-section of the cavity has a different shape than the cross-section of the tube.

According to some embodiments of the invention, the fluid inlet is substantially perpendicular to the elongated cavity.

According to some embodiments of the invention, the first elastic ring is positioned in a groove in the cavity, and wherein the inlet fluid passes fluid from the inlet into the groove in order to deform the elastic ring.

According to some embodiments of the invention, the first elastic ring conforms to the shape of the groove when inserted therein.

According to some embodiments of the invention, the seal further comprises a second elastic ring surrounding the first elastic ring and wherein said fluid inlet comprises a fluid inlet for radially pressing the second elastic ring against the first elastic ring, thereby pressing the first elastic ring against the wall of the tube inserted in the cavity.

According to some embodiments of the invention, the seal further comprises:
an elongated shaft positioned within the elongated cavity, such that the inserted tube surrounds the shaft;
a second elastic ring around the shaft; and
a second fluid inlet for radially pressing the second elastic ring against the inner surface of the wall of the inserted tube and against the first elastic ring.

According to some embodiments of the invention, the second elastic ring is positioned in a groove in the elongated shaft, and wherein the second inlet fluid passes fluid from the inlet into the groove in the shaft order to deform the elastic ring.

According to some embodiments of the invention, the second elastic ring conforms to the shape of the groove in the shaft when inserted therein.

According to some embodiments of the invention, the first and second inlets comprise a single inlet.

According to some embodiments of the invention, the first tube comprises at least one hole at its end and the first elastic ring is positioned on one side of the at least one hole, and the seal further comprises a second elastic ring at a side opposite the one side of the at least one hole, and the fluid inlet comprises at least one fluid inlet for radially pressing the first elastic and second elastic rings against the wall of the tube inserted in the cavity.

According to some embodiments of the invention, a second tube is connected to the seal.

According to an aspect of some embodiments of the present invention there is provided a method of connecting two tubes, the method comprising:

providing a first tube connected to a seal;
inserting an end of a second tube into an elongated cavity in the seal; and
radially pressing an elastic ring against the end of the second tube, thereby blocking flow out of the first and second tubes.

According to some embodiments of the invention, radially pressing comprises deforming the elastic ring to fill an area between the tube and walls of the cavity.

According to some embodiments of the invention, radially pressing comprises radially pressing by a pressurized fluid.

According to some embodiments of the invention, the pressurized fluid is air.

According to some embodiments of the invention, the pressurized fluid is water.

According to an aspect of some embodiments of the present invention there is provided a seal for blocking the flow between two tubes, the seal comprising:

a first connection for connecting a first tube or connected to a first tube;
a second connection for connecting a second tube or connected to a second tube;
a passage for flow between the first and second tubes; and
an elastic ring arranged for blocking said passage when pressed radially into the passage.

According to some embodiments of the invention, the seal further comprises a fluid inlet substantially perpendicular to said second connection for receiving fluid to radially press the elastic ring into the passage.

According to some embodiments of the invention, the passage comprises:

a housing comprising an elongated cavity for receiving an end of the first tube or connected to the first tube;
a passage around the housing connected to the second connection; and
at least one hole in said housing, connecting the cavity passage.

According to some embodiments of the invention, the fluid inlet is substantially perpendicular to the elongated cavity.

According to an aspect of some embodiments of the present invention there is provided a seal for checking the quality of a connection between two tubes, the seal comprising:

an elongated cavity for receiving two connected tubes;

a first elastic ring in the cavity;
a second-elastic ring in the cavity; and at least one fluid inlet for radially pressing the elastic rings against the connected tubes.

According to some embodiments of the invention, the seal further comprises an outlet from a space between the first and second elastic rings.

According to some embodiments of the invention, the seal further comprises a measurement instrument connected to the outlet.

According to some embodiments of the invention, the first elastic ring is provided in a first groove in the cavity and the second elastic ring is provided in a second groove in the cavity.

According to some embodiments of the invention, the first and second elastic rings are adapted to deform and fill an area between one of the tubes and walls of the cavity when radially pressed.

According to some embodiments of the invention, the cross-section of the first or second elastic ring when not pressurized is different than the cross section of the first or second tube.

According to some embodiments of the invention, the cross-section of the first or second elastic ring when not pressurized is different than the cross section of the cavity.

According to some embodiments of the invention, the cross-section of the cavity has a different shape than the cross-section of the tubes.

According to some embodiments of the invention, the at least one fluid inlet is substantially perpendicular to the elongated cavity.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
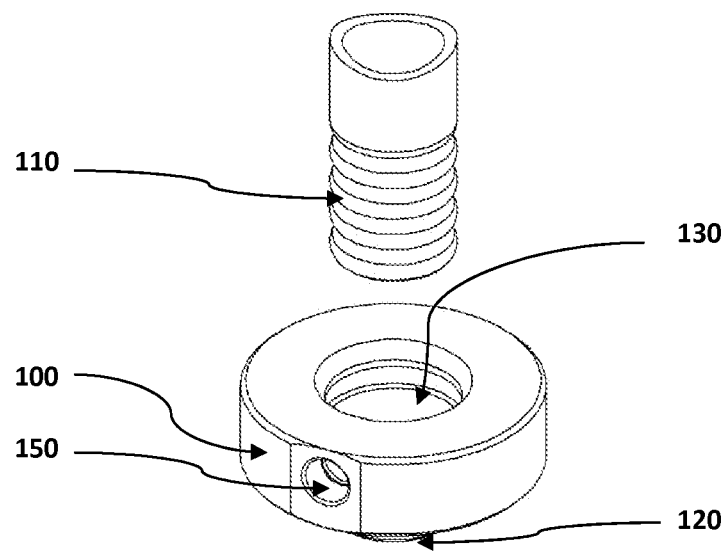
FIGS. 1A and 1B are schematic illustrations of a seal for connecting two tubes in accordance with some embodiments of the invention.

The present invention, in some embodiments thereof, relates to a seal for connecting two tubes or for checking the connection between two tubes.

An aspect of some embodiments of the invention relates to a seal for connection of two tubes, where the seal comprises at least one elastic ring which is radially pressed against a tube, thereby sealing the connection of the tubes. Preferably the pressure is applied by a fluid (gas or liquid) that presses against a side of the ring, radially opposite from the side pressed against the tube.

Tubes, as used herein refer to any tubes for the passage of fluid such as liquid or gas. Optionally, the tubes comprise pipes for the passage of water or other liquid. The tubes may comprise different cross-sections, such as round, elliptical, square, hexagonal, etc. Optionally, the tubes comprise an irregular or non-symmetrical cross section. The tubes may be made of any material, for example solid materials such as metal, glass, ceramic, plastic, etc. or be made of flexible materials such as different kinds of rubber or silicone. The tubes may be stationary. In some embodiments, the tubes are rotating, while connected to the seal, during sealing of the connection and/or when the connection is sealed.

Elastic rings or o-rings as used herein refer a flexible or elastic structure sealing which may have different cross-sections, such as round, elliptical, rectangle, square, etc. In some embodiments of the invention, the seal comprises a first elongated cavity for receiving an end of a first tube. Optionally, the cavity corresponds to the shape of the tube, i.e. having a circular or elliptical cross-section, and is optionally wider than the tube to enable easy insertion of the tube into the cavity. Optionally, the size of the cross section of the cavity is between 0.01 mm-4 mm more than the cross section of the tube, such as for example between about 1 mm-4 mm or about 2 mm-3 mm more than the cross-section of the tube. Alternatively, the cavity has a different cross-section than the tube and is large enough to receive tubes of different cross-sections.

At least one o-ring is positioned in the cavity surrounding the inserted tube. After insertion of the tube into the cavity, the o-ring is radially pressed against the tube, for example, by fluid pressure, thereby conforming to the cross-section of the tube and sealing the passage of fluid between the tube and the cavity. In some embodiments, the o-ring has substantially the same form and/or size as the cross-section of the cavity. Alternatively, the o-ring may have other sizes and shapes and the o-ring conforms to the shape and size of the tube when pressed against the tube. Preferably the pressure is applied by a fluid (gas or liquid) that presses against the radially side of the ring, substantially opposite from the side pressed against the tube.

The at least one o-ring is made of a generally elastic material, such as rubber, silicone or suitable plastic, and is adapted to change its shape when pressed against a tube. Preferably, when pressed against the tube it conforms to the shape of the tube on the side pressed against the tube and to the shape of the walls of the cavity on the side of the ring facing the cavity. In some embodiments, the thickness of the o-ring enables different sizes of tubes to be sealed by the seal. The thickness of the o-ring compensates for the difference in cross-section between the cavity and the tube. Optionally, the o-ring is between 0.5 mm-6 mm thick, for example about 2 mm-4 mm thick.

In some embodiments, at least two o-rings surround the tube, where an outer ring surrounds an inner ring. When pressure (preferably fluid) is applied to the outer ring, the outer ring radially presses against the inner ring which is thereby radially pressed against the tube and seals the space between the tube and the cavity. The two o-rings are pressed by a same fluid pressure which is pressed against the side of the rings substantially opposite to the side pressed against the tube. In these embodiments, when excess pressure is applied, the outer ring might explode, leaving the inner ring intact and pressed, and the connection of the tubes remains sealed.

Optionally, the outer ring is thicker than the inner ring, thereby providing greater pressure on the inner ring. Optionally, the outer ring has a thickness of about twice or three times the thickness of the inner ring. For example, the outer ring may be between about 2 mm-18 mm thick, for example about 4.8 mm thick.

Optionally, the outer ring is made of a softer material than the inner ring, thereby requiring less fluid pressure to press the outer ring against the inner ring. For example, the outer o-ring may be made from 55 Shore A hardness material and the inner ring from 65-70 Shore A hardness material.

In some embodiments, the seal further comprises an inlet for a pressure fluid, optionally generally perpendicular to the elongated cavity for radially pressing the o-ring(s) against the inserted tube by the inlet fluid. Optionally, the inlet forms an angle of between 60°-120° with the axis of the tube. Optionally, the fluid is a pressurized gas such as air which is fed into the cavity through the inlet. Alternatively, the inlet fluid is a liquid, such as water, under pressure. The use of water can provide tighter sealing of the tube.

Releasing the pressure on the inlet fluid optionally provides quick release of the seal. Optionally, vacuum is also applied to release the ring. Optionally, the cavity into which the ring is inserted has a cone shape, where the narrow side of the cone is facing the tube. A cone shape may provide easier release of the ring when the inlet pressure is released.

An aspect of some embodiments of the invention relates to a seal for connecting to a tube made from a flexible or elastic material, such as rubber or silicone. In some embodiments the seal comprises an elongated shaft within the cavity, such that the first tube surrounds the shaft when inserted into the cavity. A second o-ring is provided in the shaft and is positioned substantially parallel to the o-ring in the cavity. As used herein, o-rings positioned parallel or non-parallel to each other means that the axes of the o-rings are parallel or non-parallel.

The two o-rings are adapted to be forced axially towards the inserted tube and towards each other, thereby conforming to the shape of the tube. The first o-ring blocks passage of fluid between the tube and the cavity in which the tube is inserted when pressed, thereby providing pressured sealing to the flexible tube. Optionally, a second inlet is provided in the seal for providing fluid to press the second o-ring. Alternatively, a single inlet provides fluid pressure for both o-rings in substantially opposite directions. The inlet fluid may be similar to the inlet for the first o-ring described above and may also provide radial pressure on the second o-ring.

Optionally, the seal comprises a second cavity for receiving an end of a second tube, thereby providing a connection between two tubes. The second cavity may have a similar structure as the first cavity described above. Alternatively, the seal is formed with a second tube at the end opposite to the first cavity. For example, a second tube may be welded to the seal. Alternatively, no second tube is provided and the seal blocks fluid from exiting the first tube.

An aspect of some embodiments of the invention relates to a seal for blocking flow from one tube to another. In some embodiments, the seal comprises a passage for the flow from the first tube to the second tube and an o-ring as described above surrounding the passage. The o-ring can be radially pressed into the passage for blocking the passage or released for enabling flow between the tubes.

An aspect of some embodiments relates to a seal for checking the quality of a connection between two tubes. In some embodiments, the seal comprises an elongated cavity including two o-rings as described above, where the o-rings are positioned at opposite sides of the connection between the tubes and each o-ring is adapted to be radially pressed against a tube and blocking passage of fluid at the surroundings of the tubes. A measurement instrument is provided between the two o-rings to check for any leakage at the connection between the two tubes. Optionally, vacuum is provided in a cavity between the two o-rings for checking leakage.

In some embodiments, the o-rings, when pressured against the tubes, conform their shape to the shape of the tubes, thereby enabling two tubes to be connected at an angle (not coaxial).

Optionally, in any of the embodiments described herein, the o-rings are pressure by fluid pressure only, and no other means for pressuring the o-rings are provided.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
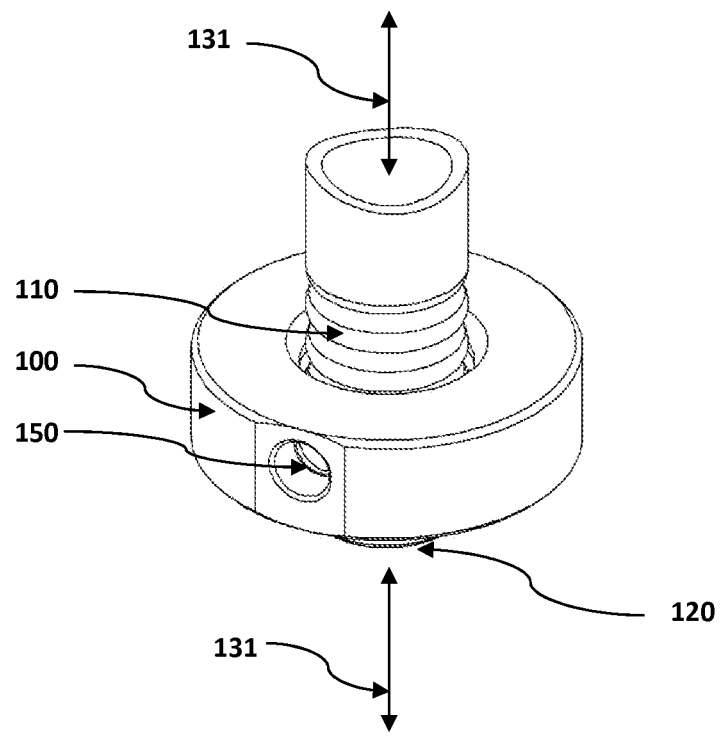
Figure 2A:
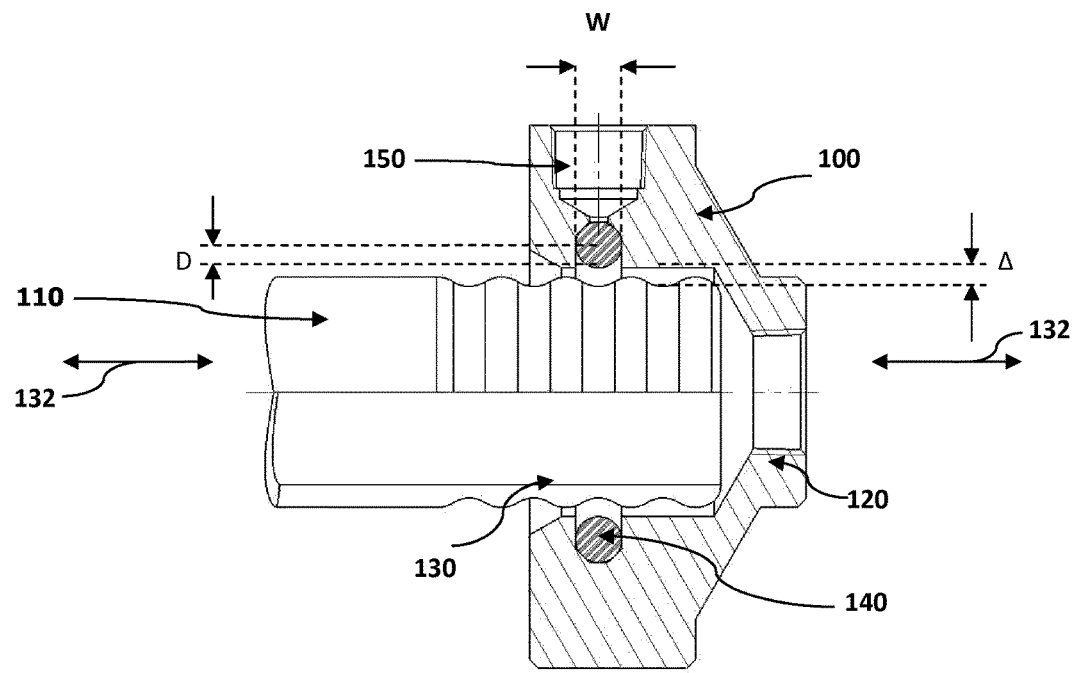
FIGS. 2A and 2B are cross-sectional illustrations of the seal and tubes of FIGS. 1A and 1B in open and closed state in accordance with some embodiments of the invention.
Figure 2B:
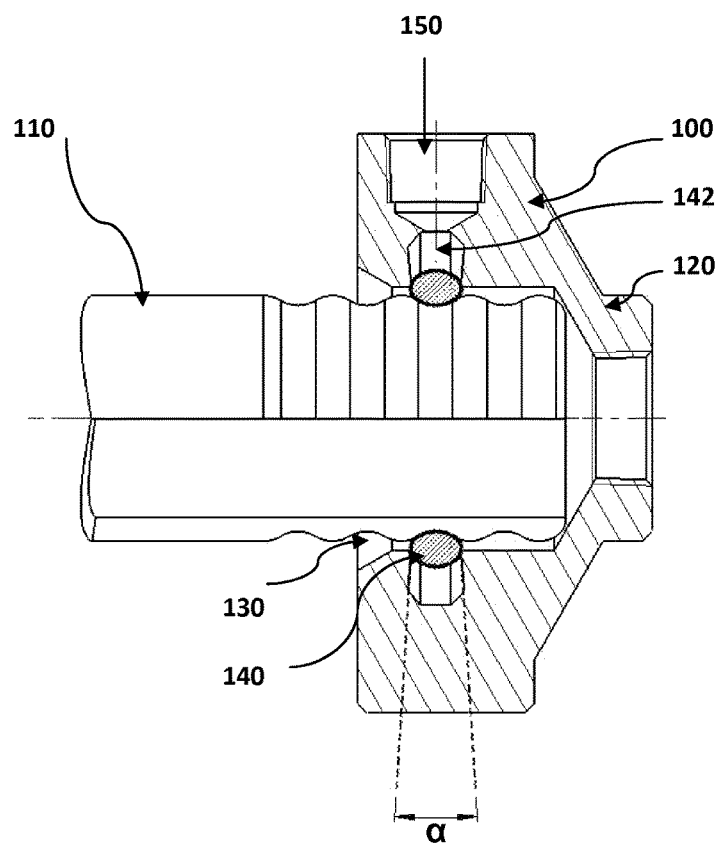

Referring now to the drawings, FIGS. 1A and 1B are schematic illustrations of a seal 100 for connecting first and second tubes, 110 and 120, in accordance with some embodiments of the invention. FIG. 1A illustrates seal 100 and first tube 110 separate from each other and FIG. 1B illustrate seal 100 connected to tube 110. FIGS. 2A and 2B are cross-sectional illustrations of seal 100 connected to a first tube 110 in accordance with some embodiments of the invention.

FIG. 2A illustrates the seal in an open state and FIG. 2B illustrates the seal in a closed state, blocking leakage at the connection between tubes 110 and 120 and enabling flow in the directions 131 and 132 shown in FIGS. 1B and 2A respectively without leakage.

Second tube 120 is shown cut off in the figures for simplicity. Tube 120 is welded or formed together with seal 100. In other embodiments, tube 120 may be connected to seal 100 in accordance with any other method known in the art, such as for example threads, or with any of the seals described herein.

Seal 100 includes an elongated cavity 130 for receiving an end of tube 110. Optionally, the cavity corresponds to the exterior shape of tube 110, for example having the same cross-sectional shape as tube 110. For example, the cavity can have a circular shape for a circular tube, a hexagonal shape for a hexagonal tube or an elliptical shape for an elliptical tube.

The cross-section of cavity 130 is optionally somewhat larger than the external cross-section of the end of tube 110 to enable easy insertion of tube 110 into cavity 130, for example, the cavity may be between 0.01 mm-4 mm larger than the external cross-section of the end of the tube, such as between 1 mm-3 mm or 2 mm larger. Alternatively, the cavity has the exact same shape and size as the external cross-section of the end of tube 110.

Optionally, cavity 130 is wide enough to receive tubes of different cross-sections, for example a circular cavity may receive a non-symmetrical, elliptical or square shaped tube. Alternatively or additionally, the cavity may receive a tube with an irregular cross-section wherein the cross-section of the tube is varies along the length of the tube. For example, in FIGS. 1 and 2, the end of tube 110 has an irregular cross-section and is received in cavity 130 having a circular cross section. For tubes with an irregular cross-section, the description above regarding the difference between the cavity and the external cross-section of the tube refers to the minimal cross-section of the part of the tube inserted into the cavity.

An o-ring 140 is positioned in a groove 142 (shown in FIG. 2B) in cavity 130 surrounding inserted tube 110. O-ring 130 is preferably made of an elastic material, such as rubber, silicone or suitable plastic, and is adapted to change its shape when pressed against a tube. For example, o-ring 130 may be made of Neopren, Polyurethane or similar materials.

In some embodiments, o-ring 140 has substantially the same shape and/or size as the cross-section of cavity 130. In other embodiments, the o-ring can have other shapes and/or size than cavity 130 and/or tube 110. For example, simple circular o-rings can be used with any shape of tube and cavity. The o-ring can have an inner diameter which is larger (as illustrated) than the diameter of cavity 130. Optionally, when inserted into groove 142, o-ring 140 conforms to the shape of the groove. In other embodiments, the o-ring can have a diameter which is smaller than the diameter of the cavity, such that it extends by a small amount into the cavity.

In some embodiments, the groove has a cone shape with the narrow side of the cone facing the tube (not shown). The cone shape may assist in releasing the o-ring and sealing of the tubes.

The elastomer material of the o-ring enables the o-ring, when pressed, to conform its shape to the external cross-section of the portion of the tube against which it is pressed on the side of the ring facing the tube and to be pressed against the walls of the groove on the opposite side of the rings, thereby blocking passage of fluids between the outside of the tube and the walls of cavity 130. For example, FIG. 2A illustrates the seal in an open position, where o-ring 140 has substantially the same shape as the cross-section of cavity 130. To seal the tubes, o-ring 140 is radially pressed against tube 110 and conforms to the irregular cross-section of tube 110 and to the walls of groove 142.

In some embodiments, the thickness of the o-ring enables different sizes of tubes to be sealed by the seal. The thickness of the o-ring allows for the o-ring to conform to different sizes of the tube while sealing the connection despite the difference in cross-section between the cavity and the tube. The thickness of the o-ring as used herein refers to the height of the cross-section of the ring. The radius of the height of the cross-section of the ring is indicated as D in FIG. 2A. Δ illustrates the maximum difference between the cross-section of the cavity and the cross-section of the tube. In an exemplary embodiment of the invention, D>Δ in order to ensure sealing of the tube.

W indicates the width of the o-ring. Optionally, W is chosen to be wide enough to fill groove 142. In some embodiments, symmetrical rings are uses, wherein the width and thickness of the rings are the same, i.e. W=2*D. W and D are optionally also chosen according to the material of the o-ring, depending on the hardness of the material and elasticity thereof.

α indicates the angle between the walls of groove 142. α is optionally also chosen according to the hardness and elasticity of the material of the o-ring. In some embodiments, α is between 1°-60°. In some embodiments, walls of groove 142 are asymmetrical in that each wall has a different angle with respect to the inner walls of cavity 130.

In an exemplary embodiment, for a tube 110 having an irregular diameter of between 23-24 mm, a cavity 130 of 25 mm can be used. The thickness of the o-ring may be about 5.33 mm and the internal diameter of the o-ring may be about 26.34 mm. Groove 142 may be 4.9 mm wide with a diameter of 37 mm.

More information on the o-ring can be found for example at "Seal Design Guide" by Apple Rubber Products, the contents of which is incorporated herein by reference.

The criteria of choosing the specific sizes of o-rings described hereinabove apply to any of the o-rings described herein, with the appropriate adjustment for size and shape of the tube.

In some embodiments, the seal further comprises an inlet 150 for a fluid to groove 142, which is generally perpendicular to tubes 110 and 120 for radially pressing o-ring 140 against tube 110 by the inlet fluid. Optionally, inlet forms an angle, for example, of between 60°-120° with tube 110. Optionally, the fluid is a gas such as pressurized air which is fed into the inlet. Alternatively, the inlet fluid is a liquid, such as water. The use of water can provide tighter sealing of the tube.

Optionally, a closure (not shown) is provided on inlet 150 to prevent the inlet fluid from exiting through the inlet and thereby providing a long or even permanent seal. Optionally, the closure can be removed to release seal 100 from tube 110.

In accordance with some embodiments of the invention, tubes 110 and 120 are connected according to the following method. Tube 120 is provided connected to seal 100.

Optionally, o-ring 140 is inserted into groove 142, thereby optionally conforming the shape of o-ring 140 to the shape of groove 142. An end of tube 110 is inserted into elongated cavity 130 and a fluid is then inserted through inlet 150, thereby radially pressing o-ring 140 against the end of tube 110. O-ring 140 thereby deforms and presses against the tube so that it fills an area between walls of the cavity (or groove) and the tube. Flow out of tubes 110 and 120 is thereby blocked by cavity 130 and o-ring 140. Optionally, a closure is put on inlet 150 to prevent separation of the tubes.

In some embodiments, the connection is released by releasing pressure on the inlet fluid and/or applying vacuum.

In some embodiments of the invention, the seal comprises two o-rings surrounding a tube, where an outer o-ring surrounds an inner o-ring and wherein the outer ring is radially pressed against the inner ring which is thereby radially pressed against a tube.

Figure 10A:
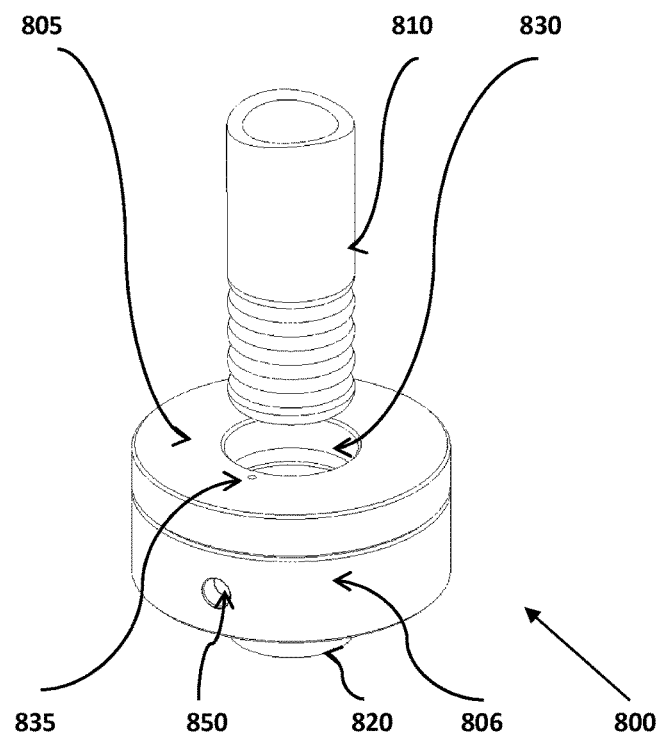
FIGS. 10A and 10B are schematic illustrations of a seal for connecting two tubes according to another embodiment of the invention.
Figure 10B:
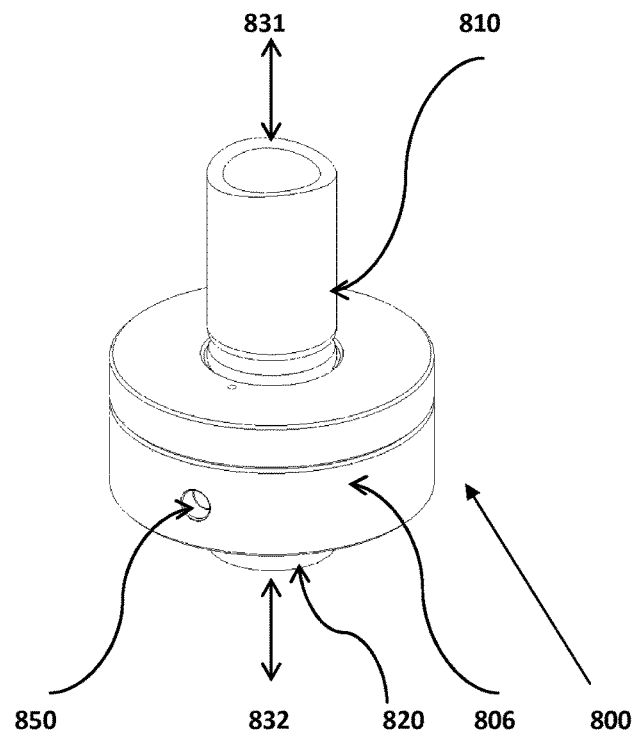

FIGS. 10A and 10B illustrate a seal 800 with two o-rings for connecting tubes 810 and 820 in accordance with some embodiments of the invention.

Figure 11A:
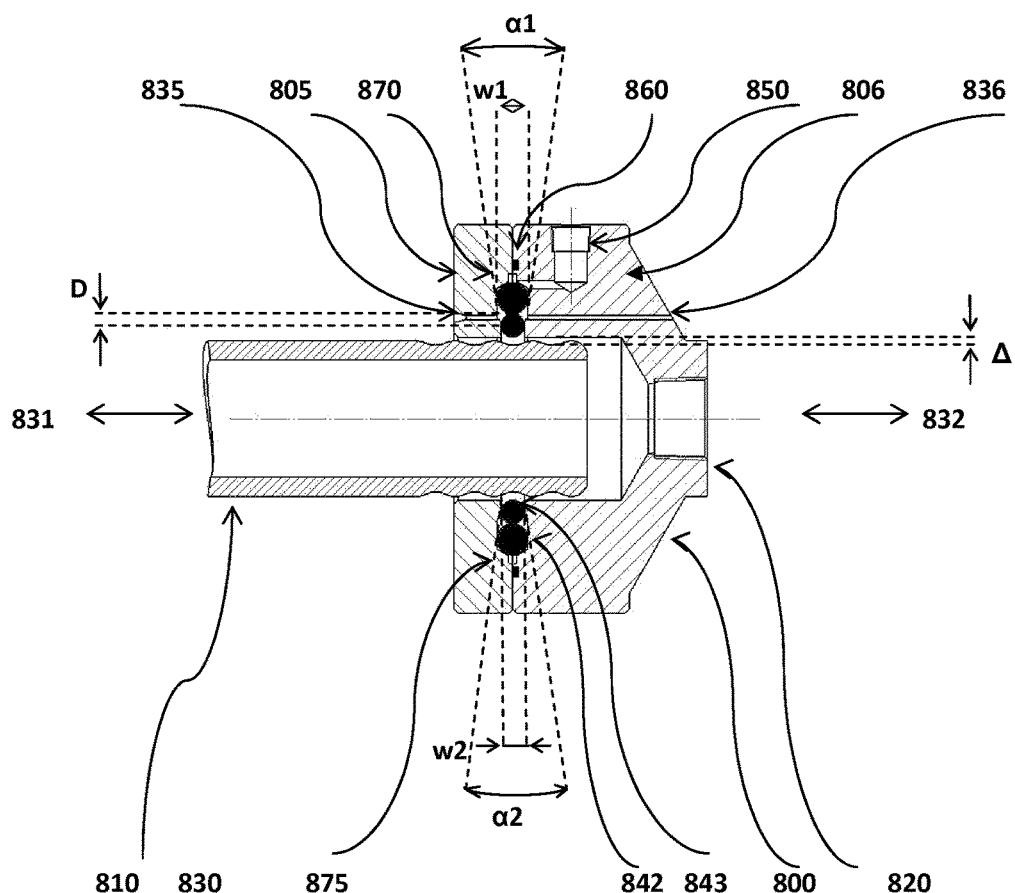
FIGS. 11A and 11B are cross-sectional views of the seal of FIGS. 10A and 10B in open and closed states in accordance with some embodiments of the invention.
Figure 11B:
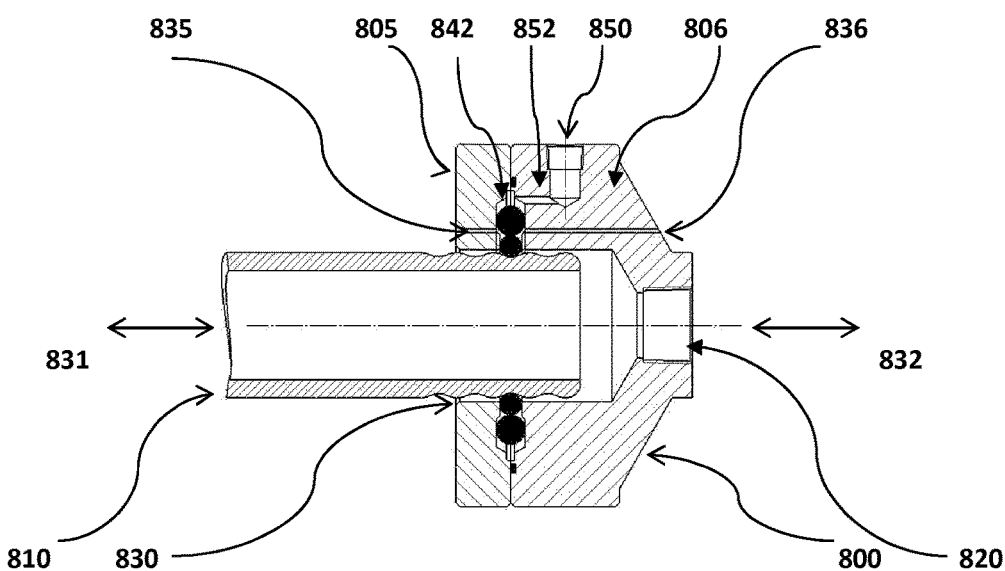

FIG. 10A illustrates seal 800 and first tube 810 separate from each other and FIG. 10B illustrate seal 800 connected to tube 810. FIGS. 11A and 11B are cross-sectional illustrations of seal 800 connected to a first tube 810 in accordance with some embodiments of the invention.

FIG. 11A illustrates the seal in an open state and FIG. 11B illustrates the seal in a closed state, blocking leakage out of tubes 810 and 820 and enabling flow in the directions 831 and 832 shown in FIGS. 10B, 11A and 11B respectively without leakage.

Seal 800 includes an elongated cavity 830 for receiving an end of tube 810. Cavity 830 is similar to cavity 130 described above. Seal 800 is optionally comprised of a body 806 and a flange 805 for simplifying the manufacturing process. Optionally, a stationary o-ring is optionally provided for sealing between body 806 and flange 805.

Alternatively, the body of seal 800 is formed of a single piece.

Tubes 810 and 820 correspond to tubes 110 and 120 described with respect to FIGS. 1 and 2 above. In addition, seal 800 is similar to seal 100 described above, except that seal 800 uses two o-rings, an outer o-ring 842 surrounding an inner ring 843 instead of a single o-ring 130 in seal 100. When two o-rings are provided, excess pressure, for example from an inlet fluid pressing the ring, will tear the outer o-ring while leaving the inner o-ring intact and prevent penetration of external pressure into cavity 830. In addition, less pressure may be required for sealing the tubes when two-rings are used as opposed to a single o-ring.

A groove 842 is optionally provided in cavity 830, surrounding inserted tube 810, for receiving an outer o-ring 842 and optionally also an inner o-ring 843 according to some embodiments of the invention. O-rings 842 and 843 are similar to o-ring 130 described above.

In some embodiments, the seal further comprises an inlet 850 for a fluid to groove 842, which is optionally generally perpendicular to tubes 810 and 820 for radially pressing o-ring 842 against o-ring 843 by the inlet fluid. Optionally, inlet forms an angle, for example, of between 60°-120° with tube 810. Optionally, inlet 850 is not positioned exactly above the o-rings, but is connected by a tube 852 to the o-rings and the end of the connecting tube 852 is generally perpendicular to tube 810, as shown in FIGS. 11A and 11B. Optionally, the fluid is a gas such as pressurized air which is fed into the inlet. Alternatively, the inlet fluid is a liquid, such as water.

In some embodiments, both inner and outer o-rings are pressured by a same inlet pressure against a same direction, namely towards tube 810.

Optionally, a closure (not shown) is provided on inlet 850 to prevent the inlet fluid from exiting through the inlet and thereby providing a long or even permanent seal. Optionally, the closure can be removed to release seal 800 from tube 810.

Optionally, release channels 835 and 836 are provided for preventing leakage of fluid from inlet 850. Release channels such as channels 835 and 836 may be used in any of the embodiments described herein where preventing penetration of external pressure to the cavity is desired, for example in seals for connecting tubes, for blocking passage between tubes or for testing the connection between tubes where high pressure may damage fragile tubes.

In some embodiment, inner ring 843 has the same dimensions and is made of a same material as described with respect to o-ring 130 above. Alternatively, inner ring 843 may be narrower or smaller than o-ring described above as it is pressed using outer o-ring 842. In some embodiments, outer ring 842 is thicker and/or wider than o-ring 843 thereby being more resistant to pressure. For example, outer ring 842 maybe twice or three time as thick as inner ring 842. For example, the outer ring may be between about 2 mm-18 mm thick, for example about 4-5 mm thick such as 4.8 mm thick. In addition, in some embodiments, outer ring 842 is made of a softer material than inner ring 843, thereby requiring less pressure for pressing outer ring 842 against inner ring 843. For example, the outer o-ring may be made from 55 Shore A hardness material and the inner ring from 65-70 Shore A hardness material.

In some embodiments, o-rings 842 and 843 are formed as a single ring, for example an x-shaped ring or a specially designed ring in the form of rings 842 and 843 shown in the figures.

Groove 842 is optionally similar to groove 142 described above. In some embodiments, groove 842 is wider on the part distal to the tube and narrower on the part proximal to the tube, to conform to the shape of o-rings 842 and 843. In addition, the wider end of the groove enables easier release of the o-ring when pressure is ceased.

In accordance with some embodiments of the invention, tubes 810 and 820 are connected according to the following method. Tube 820 is provided connected to seal 800. Optionally, o-rings 843 and 842 are inserted into groove 842 such that outer ring 842 surrounds inner ring 743, thereby optionally conforming the shape of o-rings 842 and/or 843 to the shape of groove 842. An end of tube 810 is inserted into elongated cavity 830 and a fluid is then inserted through inlet 850, thereby radially pressing outer o-ring 842 against inner o-ring 843 in the direction of tube 810, whereby inner o-ring 843 is radially pressed against the end of tube 810. O-ring 843 thereby deforms and presses against tube 810 so that it fills an area between the walls of cavity 830 (or groove 842) and tube 810. Flow out of tubes 810 and 820 is thereby blocked by cavity 830 and inner o-ring 843. Optionally, a closure is put on inlet 850 to prevent separation of the tubes.

In some embodiments, the connection is released by releasing pressure on the inlet fluid and/or applying vacuum.

The use of two o-rings (or an o-ring in the form of two o-rings) instead of a single o-ring as described above may be applied to any of the embodiments described herein, with the appropriate adjustment.

Figure 3A:
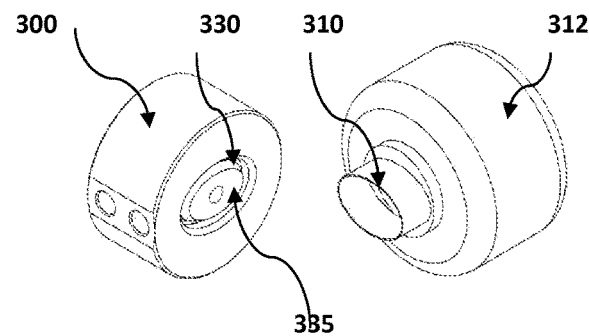
FIG. 3A is a schematic illustration of a seal to which a flexible tube can be connected in accordance with exemplary embodiments of the invention.
Figure 3B:
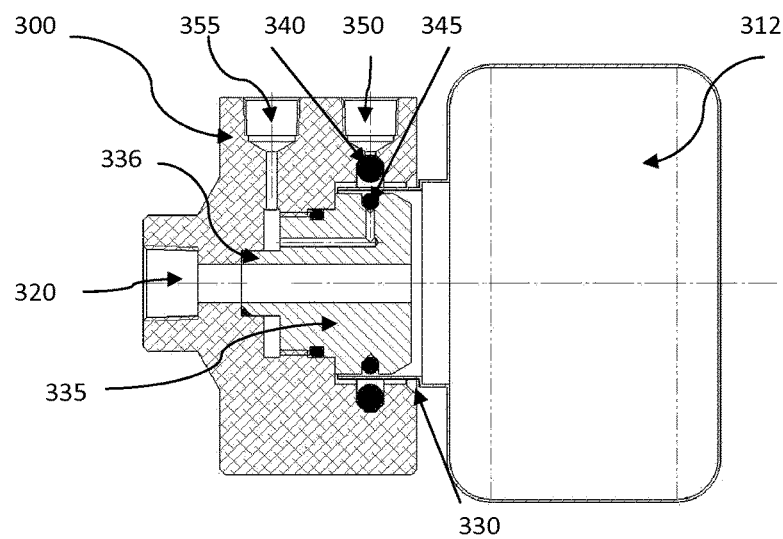
FIGS. 3B and 3C are cross-sectional illustration of the seal and tube of FIG. 3A in open and closed states in accordance with some embodiments of the invention.
Figure 3C:
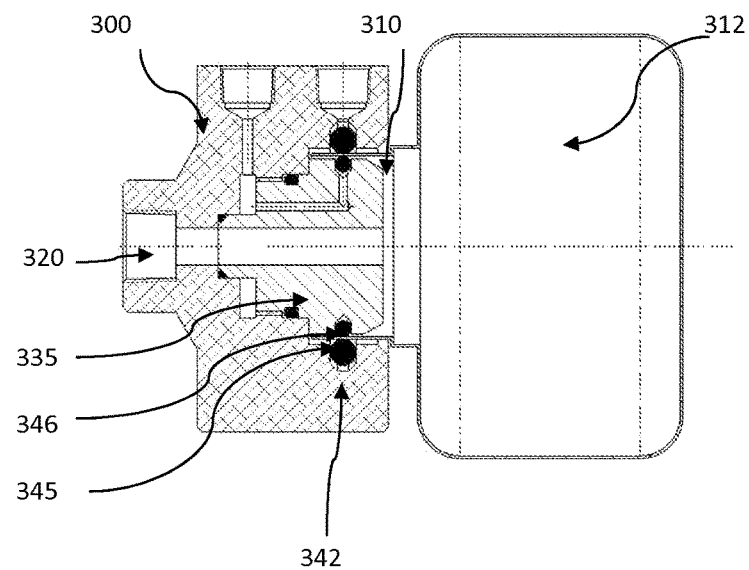

In some embodiments, a flexible tube may be connected to a seal. FIG. 3A is a schematic illustration of a seal 300 to which a flexible tube 310 can be connected. FIG. 3B is a cross-sectional illustration of seal 300 and tube 310 in open state and FIG. 3C is a cross-sectional illustration of seal 300 and tube 310 in a closed state.

Tube 310 is shown as an elliptical terminal of a reservoir 312. In accordance with some embodiments of the invention, tube 310 may have any cross-section, any length and be connected to different reservoirs, other tubes or not. Tube 310 is optionally made from a flexible or elastic material, such as rubber or silicone, which tend to deform when subject to force. A second tube 320 (shown cut-off in FIGS. 3B and 3C) is connected to the other end of seal 300, optionally by welding, threading or by a method as described herein or is formed together with the seal.

Seal 300 includes an elongated cavity 330, similar to cavity 130 described with respect to FIGS. 1 and 2 above. An elongated shaft 335 is positioned within the cavity and connected to seal 300 at end 336. Shaft 335 may be formed with seal 300 or welded thereto. When inserted into cavity 330, tube 310 surrounds shaft 335 as shown in FIG. 3B.

In some embodiments, shaft 335 has substantially the same shape as cavity 330, i.e. they are both circular, elliptical, square, hexagonal, etc. Shaft 335 is generally smaller in cross-section than cavity 330, such that tube 310 is inserted into cavity 330 and surrounds shaft 335. Optionally, the difference in cross-section between cavity 330 and the external cross-section of shaft 335 is between about 1 mm-4 mm, for example between 2 mm-3 mm.

Seal 300 includes two o-rings, positioned substantially parallel to each other. A first o-ring 340 is positioned in a groove 342 in cavity 330, similar to o-ring 140 described with respect to FIG. 2 above. A second o-ring 345 is positioned in a groove 346 (FIG. 3C) in shaft 335. Optionally, o-ring 345 has the same shape as the cross-section of shaft 335 or of groove 346. Alternatively, o-ring 345 has a different shape and may conform to the shape of groove 346 when inserted therein, as detailed with respect to ring 140 and cavity 130 with groove 142 in FIG. 2 above.

The two o-rings are adapted to be radially deformed by pressure towards tube 310 and towards each other, thereby sealing leakage from tube 310 without substantially deforming the tube. Optionally, when pressed, o-ring 640 fills an area between the walls of cavity 330 (or groove 342) and tube 310 and o-ring 645 fills and area between groove 346 and tube 310. Optionally, o-rings 340 and 345 have substantially the same thickness (diameter cross-section). Alternatively, one of the o-rings is thicker than the other, the thicker o-ring adapted to apply more pressure than the thinner one. For example, when a flexible tube can be deformed by applying external force on the tube but is made from a material that does not expand, o-ring 345 can be made thicker than o-ring 340.

O-ring 340 is adapted to be pushed by fluid from an inlet 350 and o-ring 345 is adapted to be pushed by fluid from inlet 355. When pressured, the o-rings deform and are pressed against tube 310 thereby sealing the areas between tube 310 and grooves 342 and 346 respectively. The inlet fluid may be the same as the inlet fluid described with respect to FIG. 2 above. Optionally, fluids inserted through inlets 350 and 355 are different fluids.

In some embodiments, inlets 350 and 355 are combined into a single inlet through which fluid is inserted to close seal 300.

Figure 8:
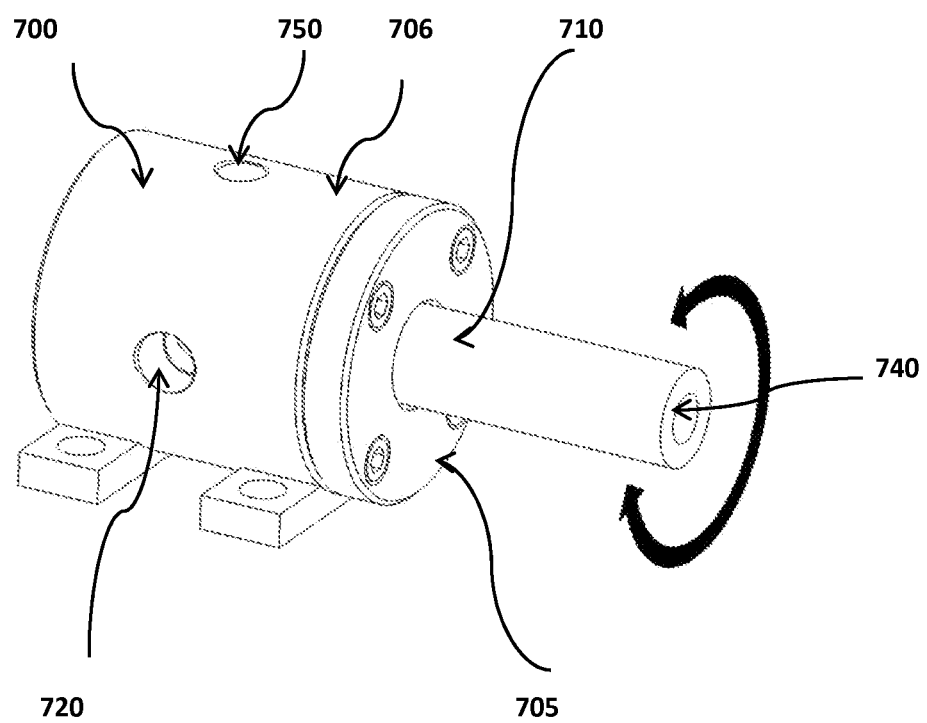
FIG. 8 is a schematic illustration of a seal to which a rotating tube can be connected in accordance with some embodiments of the invention.
Figure 9A:
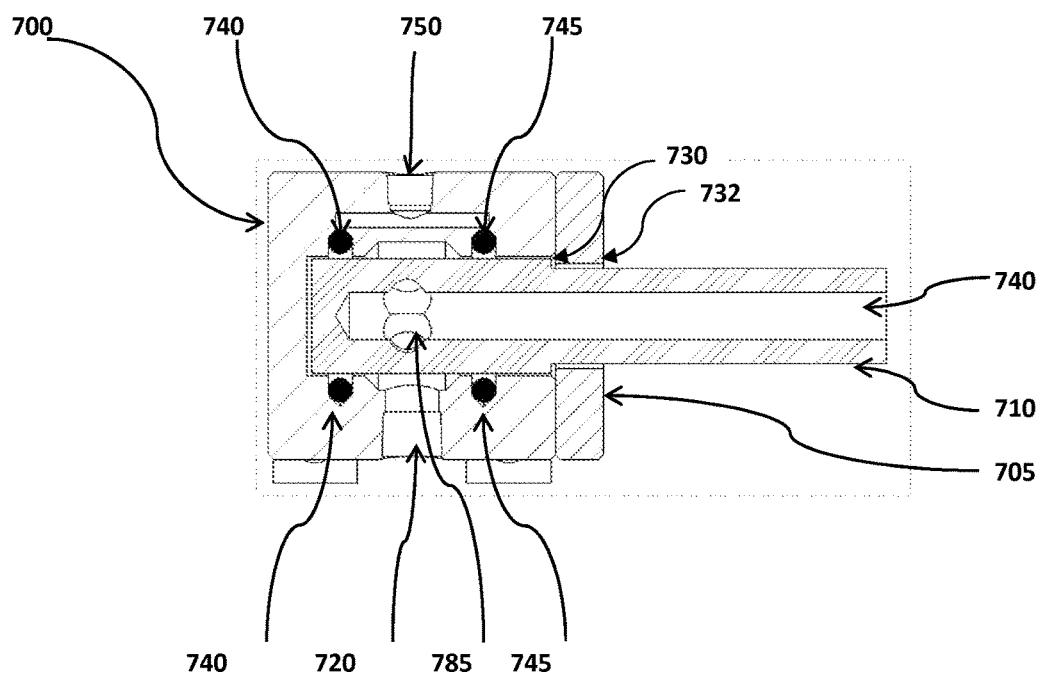
FIGS. 9A and 9B are cross-sectional views of the seal of FIG. 4A in open and closed state in accordance with some embodiments of the invention.
Figure 9B:
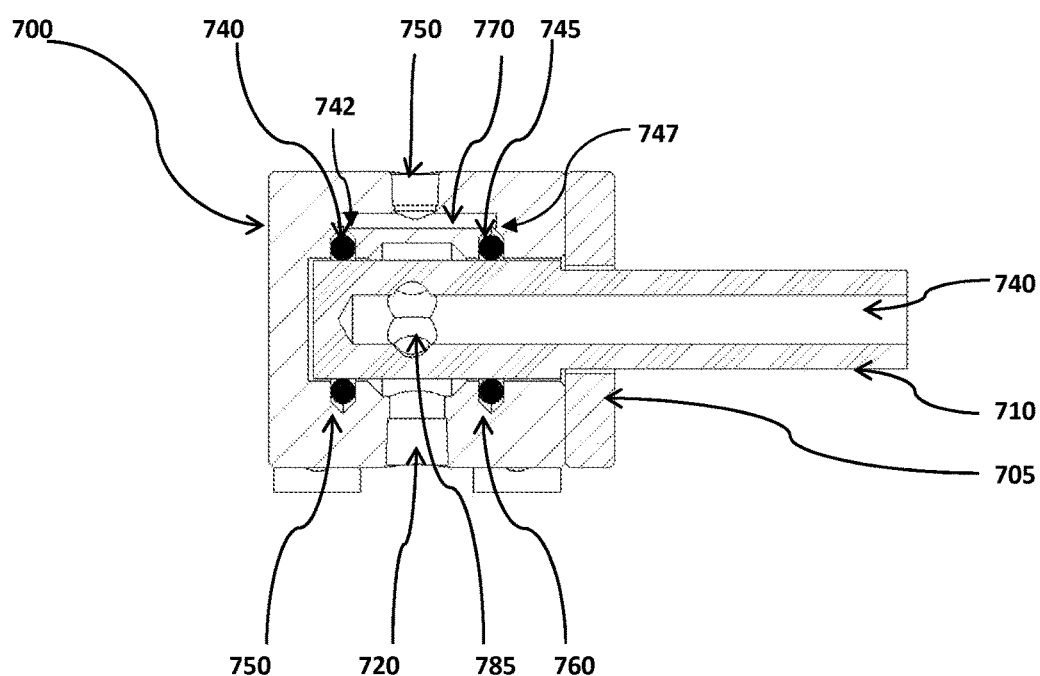

In accordance with some embodiments of the invention, a rotating tube may be connected to a seal (or rotary connector). FIG. 8 is a schematic illustration of a seal 700 to which a rotating tube 710 can be connected. FIG. 9A is a cross-sectional illustration of seal 700 and tube 710 in open state and FIG. 9B is a cross-sectional illustration of seal 700 and tube 710 in a closed state.

Tube 710 is shown having a circular cross-section. In accordance with embodiments of the invention, tube 710 may have any cross-section, any length and be connected to different reservoirs, other tubes or not. In some embodiments, tube 710 has a plurality of pipes in it, each providing a flow path for different fluid, optionally at different pressure.

In some embodiments, tube 710 has a smooth surface, enabling the tube to rotate while sealed by an o-ring pressed against it. In some embodiments, the o-ring is made of an elastomer which is resistant to abrasion and optionally has low friction coefficient with the surface of rotating tube 710. Rotating tube has optionally a hardened and ground surface. For example, tube 710, and optionally also seal 700, may be made of carbon steel.

A second tube 720 is connected to the other end of seal 700, optionally by welding, threading or by a method as described herein or is formed together with the seal. Tube 720 is shown cut off for convenience.

Optionally, seal 700 comprises of a body 706 and a flange 705 for preventing rotating tube 710 to move out of body 700. Body 706 includes an elongated cavity 730, similar to cavity 130 described with respect to FIGS. 1 and 2 above, into which an end of tube 710 is inserted. Flange 805 also includes a cavity 732 for inserting the end of tube 710, optionally cavity 732 is slightly narrower (smaller cross-section) than cavity 730 for preventing tube 710 to move out of cavity 730 during rotation. Alternatively, seal 700 is made of a single piece.

Seal 700 further includes two grooves 742 and 747 surrounding tube 710 at two opposite sides to the connection to tube 720. Two o-rings 740 and 745 are inserted into grooves 742 and 747 respectively. Grooves 742, 747 and rings 740, 745 are similar to groove 142 and 140 described with respect to FIGS. 1 and 2. In some embodiments, rings 740 and/or 745 are made of a material that enables the rings to be pressed against tube 710, during rotation of the tubes.

The thickness, width and material of rings 742 and 747 are optionally chosen so as to compensate for the difference between the cross-section of cavity 730 and the cross-section of tube 710 as described with respect to ring 140 above. Optionally, the two rings and grooves are identical. Alternatively, different rings can be used, for example in cases where multiple rotating connectors are used to transfer different fluids (liquid or gas) with different level of pressure.

In some embodiments, an inlet 750 is provided for passing a fluid to grooves 742 and 747. Optionally, inlet 750, is optionally generally perpendicular to tube 710 for radially pressing o-rings 740 and 745 against tube 710. Optionally, inlet forms an angle, for example, of between 60°-120° with tube 710. Optionally, inlet 750 is not positioned exactly above the o-rings, but is connected by a tube to the o-rings, as shown in FIGS. 9A and 9B. Optionally, the fluid is a gas such as pressurized air which is fed into the inlet. Alternatively, the inlet fluid is a liquid, such as water. In some embodiments, separate inlets are provided for the two o-rings.

In some embodiments (not shown), two separate fluid inlets are provided, one for pressing each of o-rings 740 and 745.

In some embodiments, o-rings 740 and 745 are pressured by fluid pressure only and no other pressuring means are provided.

Pressing the o-rings by fluid pressure against the tubes enables the o-rings to be less subject to wear and keep sealing the connection for longer periods. Friction and wear of the rings will cause the rings to be pressed more strongly against the tubes until the rings are eventually torn.

In addition, in some embodiments, the o-rings are pressured against the rotating tube when fluid is passed through the rotating tube only and the o-rings are released (i.e. no fluid pressure is provided through inlet 750) when no fluid is passed through the tubes.

In some embodiments, the pressure provided by inlet 750 is dynamic. In cases where the fluid passing through tube 710 is at high pressure, the inlet pressure will be high and in case where the fluid passing through tube 710 is at lower pressure, the inlet pressure will be lower.

In some embodiments, the internal diameter of o-rings 740 and/or 745 may be the equal to or smaller than the diameter of rotating tube 710, for example about 0.1 mm less. The two o-rings are adapted to be radially deformed by pressure against tube 710, thereby filling an area between tube 710 and walls of cavity 730 (or grooves 742 and 747 respectively) and sealing leakage from tube 710, while enabling the tube 710 to rotate.

Tube 710 includes at least one hole 785 between the two o-rings and at the connection with tube 720. During rotation of tube 710, fluid passes through holes 785 to tube 720 or vice versa. Optionally a plurality of holes 785 are provided, for example between 2-6 holes, such as four holes 785, are provided.

Figure 4A:
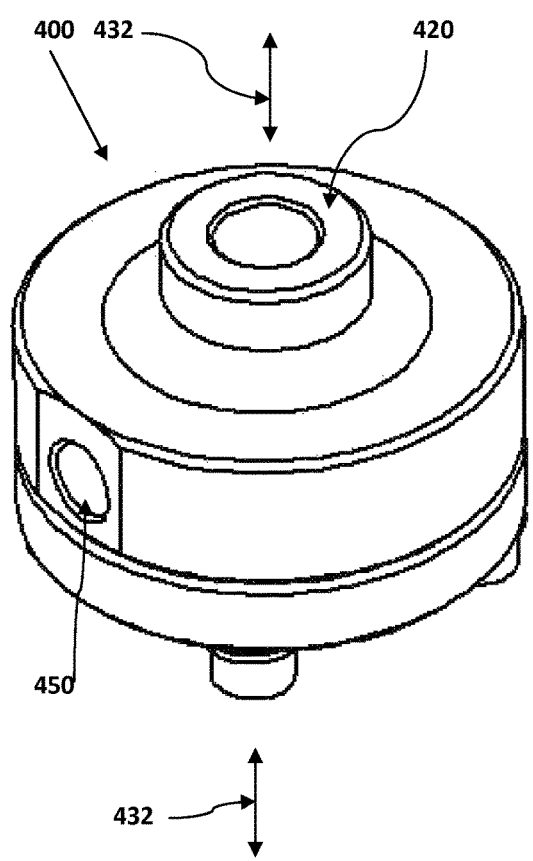
FIG. 4A is a schematic illustration of a seal/valve for selectively blocking the passage between two tubes in accordance with some embodiments of the invention.
Figure 4B:
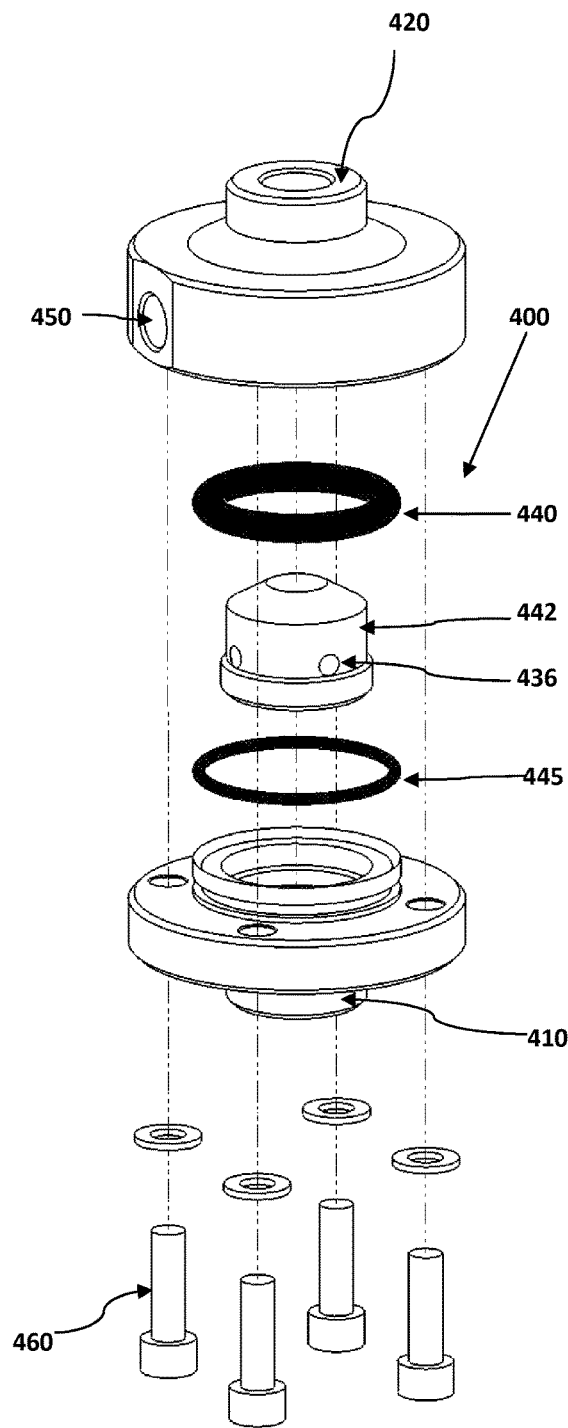
FIG. 4B is a schematic exploded illustration of the seal of FIG. 4A in accordance with some embodiments of the invention.
Figure 5A:
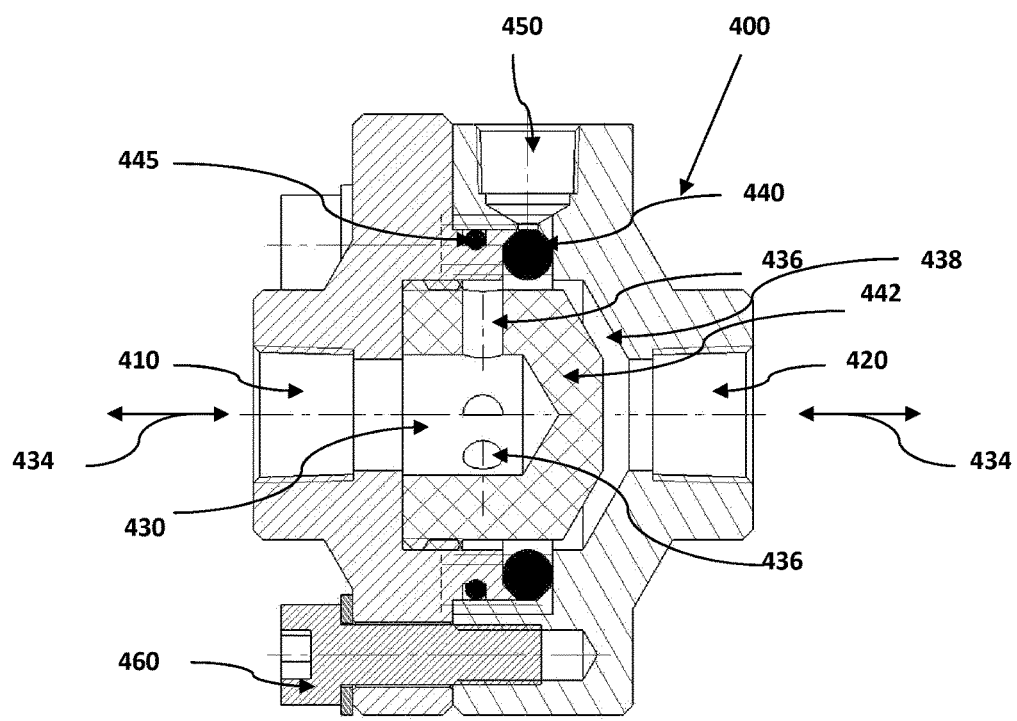
FIGS. 5A and 5B are cross-sectional views of the seal of FIG. 4A in open and closed state in accordance with some embodiments of the invention.
Figure 5B:
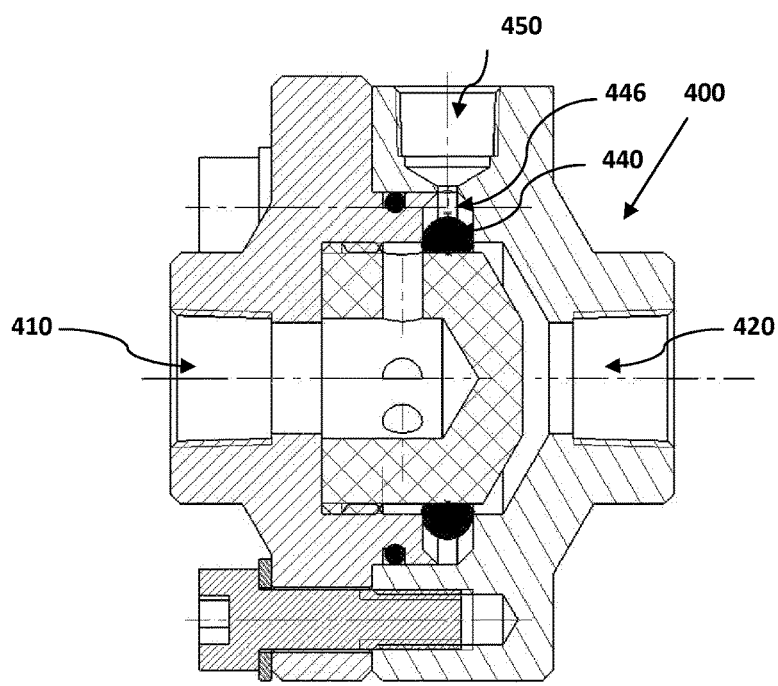

FIG. 4A is a schematic illustration of a seal 400 for selectively blocking the passage between two tubes, i.e., a valve. FIG. 4B is a schematic exploded illustration of seal 400, showing the different elements of seal 400. FIGS. 5A and 5B are cross-sectional views of seal 400 in open and closed state.

Seal/valve 400 includes two connections 410 and 420 for two tubes at two ends thereof. The tubes may be connected to connections 410 and 420 in accordance with methods known in the art, such as threads, or according to any of the embodiments described herein. The direction of flow between tubes connected to connections 410 and 420 is indicated by arrows 432 and 434 in FIGS. 4A and 5A respectively.

Valve 400 includes an elongated cavity 430 in a housing 442 through which the flow from connection 410 enters. Housing 442 includes at least one hole 436 connecting between cavity 430 and a passage 438 around housing 442. The flow from cavity 430 passes through hole 436 to passage 438 and continues to flow to connection 420. An o-ring 440 is provided, optionally in a groove 446, for blocking the flow from hole 436 to connection 420. O-ring 440 is optionally similar to any of o-rings 140, 340 or 345 described above. A fluid inlet 450 is provided, through which fluid can be inserted to radially press o-ring 438 into passage 438 and/or against housing 442, thereby blocking the flow to and from connection 420.

The blockage can be released by releasing the pressure on fluid inlet 450. The inlet fluid and inlet 450 may be the same as the inlet fluid and fluid inlet described with respect to FIGS. 1-3 above.

An additional o-ring 445 may be provided for providing sealing between the elements of seal 400. O-ring 445, as shown provides a static seal and may be replaced with other sealing means known in the art. In addition, bolts or screws 460 may be provided for screwing the elements of seal 400 together.

Figure 6A:
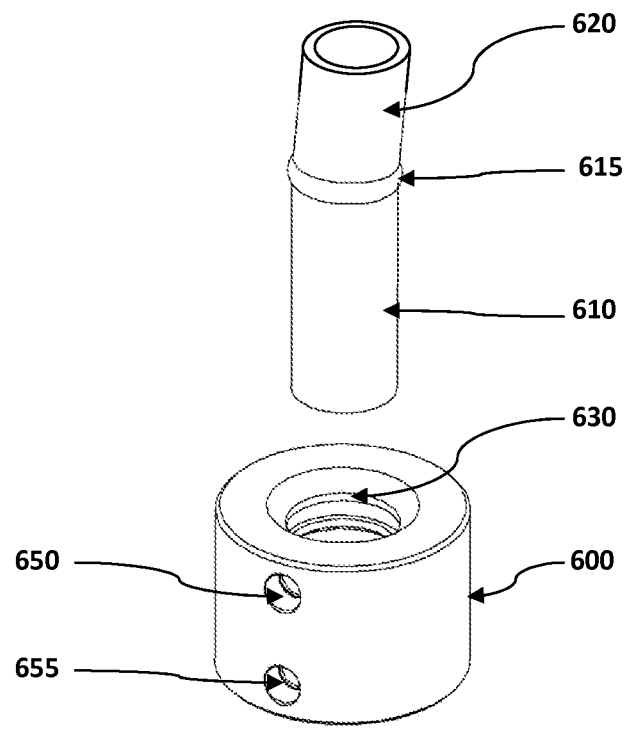
FIGS. 6A and 6B are schematic illustrations of a seal for checking the quality of a connection between two tubes in accordance with some embodiments of the invention.
Figure 6B:
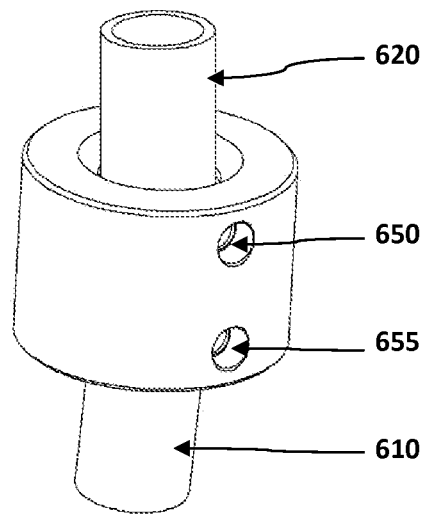

FIGS. 6A and 6B are schematic illustrations of a seal 600 for checking the quality of a connection 615 between two tubes 610 and 620. FIG. 6A illustrates seal 600 and tubes 610 and 620 separate and FIG. 6B illustrates tubes 610 and 620 inserted into seal 600.

Figure 7A:
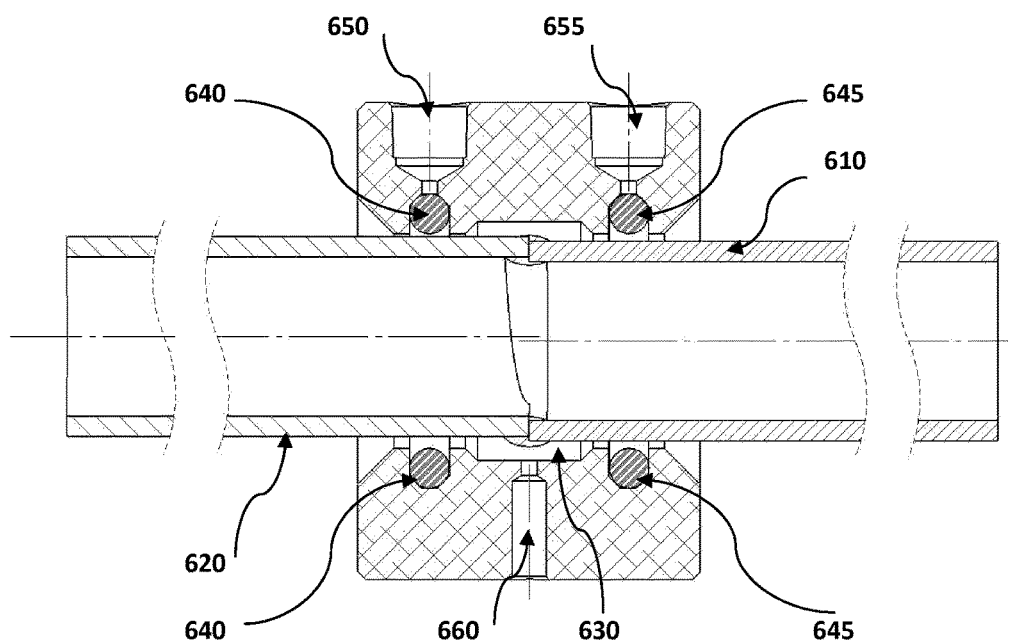
FIGS. 7A-D are cross-sectional views of the seal of FIGS. 6A and 6B in open and closed state in accordance with some embodiments of the invention.
Figure 7B:
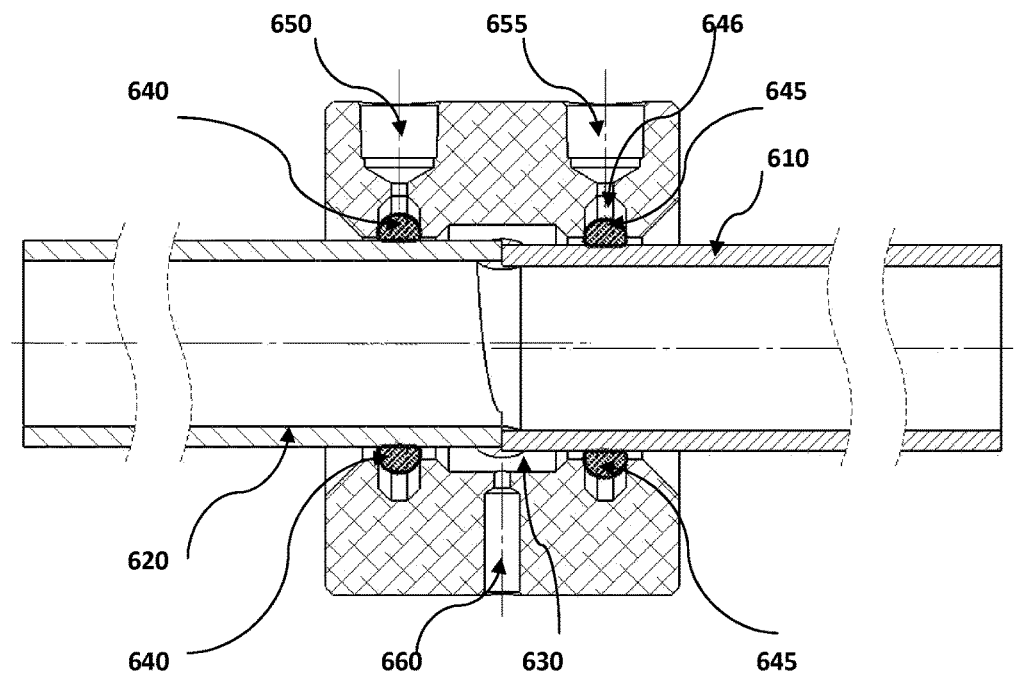
Figure 7C:
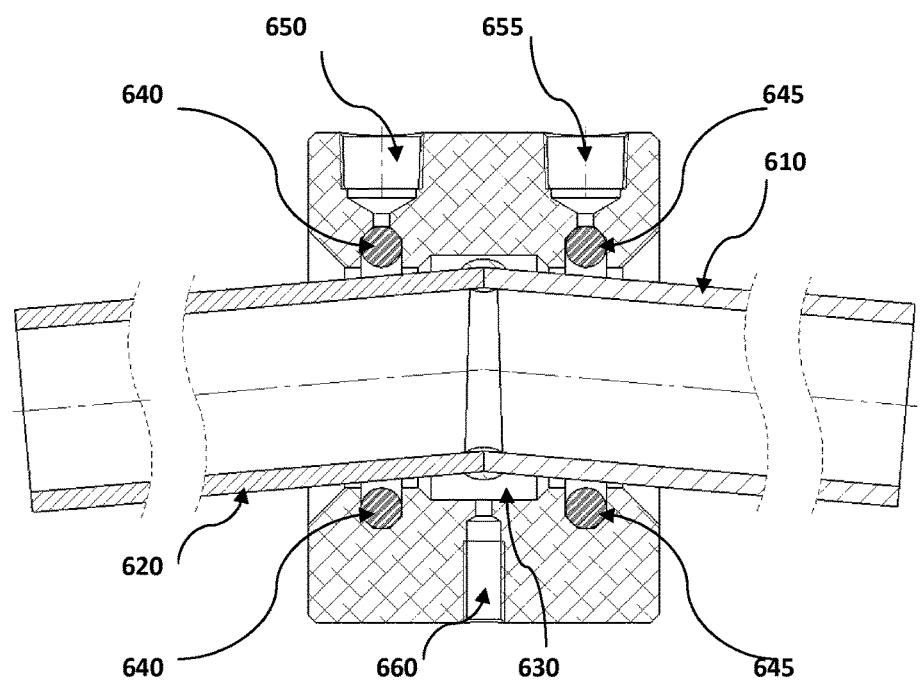
Figure 7D:
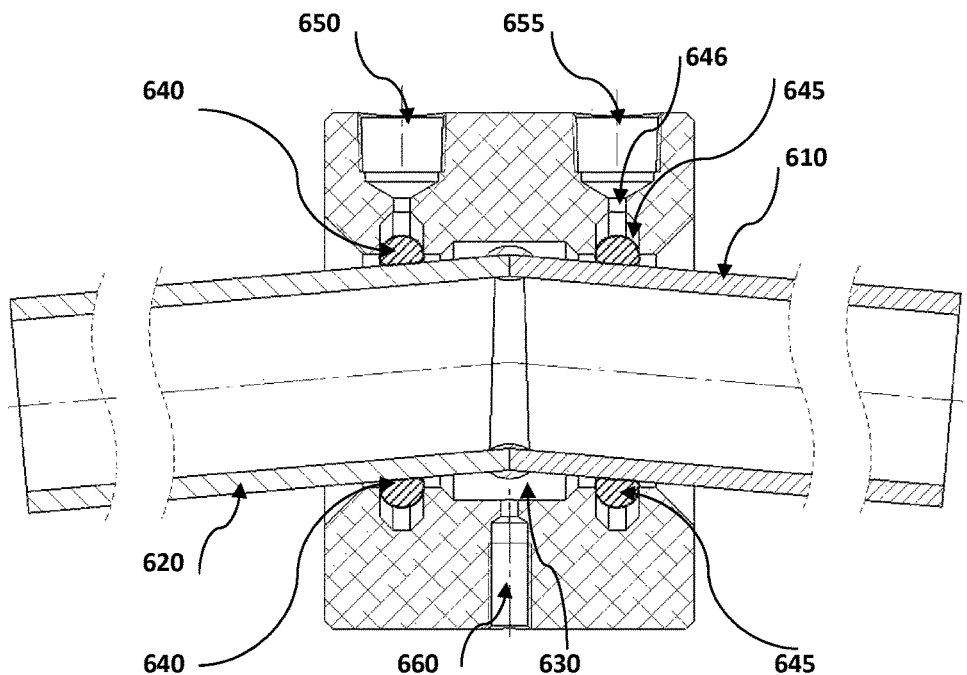

FIGS. 7A-D are cross-sectional views of seal 610 and tubes 610 and 620. FIGS. 7A and 7C show the seal in an open state and FIGS. 7B and 7D show seal 600 in a closed state in which state the quality of connection 615 between the tubes can be checked.

Seal 600 comprises an elongated cavity 630 through which the tubes can be inserted. Cavity 630 is optionally substantially wider than tubes 610 and 620, thereby enabling tubes of different cross-sections and/or tubes that are not coaxially connected to be inserted through the cavity. For example, FIGS. 7C and 7D illustrate tubes 610 and 620 connected at an angle.

For example, the cross-section of cavity 630 may be between 0.01 mm-5 mm larger than the cross-section of any of tubes 610 or 620, such as between about 1 mm-4 mm wider. Optionally, the cross-section of cavity 630 has the same shape as tubes 610 or 620. Alternatively, cavity 630 may have a different shape than any of tubes 610 or 620. For example, cavity 630 may have a round cross-section while tube 610 and/or tube 620 may have an elliptical cross-section. This may enable the connection of tubes with different cross-sections, or with irregular cross-sections to be checked by seal 600.

Seal 600 further includes two o-rings 640 and 645, optionally in grooves 642 and 646 respectively (FIGS. 7B and 7D). Tubes 610 and 620 are inserted into cavity 630 such that connection 615 is situated between o-rings 640 and 645. O-rings 640 and 645 may be the same as or similar to o-ring 140 described with respect to FIGS. 1 and 2. The thickness and width of o-ring is optionally chosen so as to compensate for the difference between the cross-section of cavity 630 and the cross-section of tubes 610 and 620 as described with respect to ring 140 above. O-rings 640 and 645 are radially pressed by a fluid, inserted through inlets 650 and 655 respectively, towards tubes 610 and 620. Optionally, o-rings 640 and/or 645 have the same shape as the external cross-section of tubes 610 and/or 620, as shown in FIGS. 7A and 7C. Alternatively, o-rings 640 and/or 645 have a different shape than the external cross-section of tubes 610 and/or 620 and may have the same shape and/or size as cavity 630 or grooves 642 and 646 as described with respect to ring 140. Optionally, o-rings 640 and 645 conform to the shapes of grooves 642 and 646 when inserted therein. Since o-rings are made from an elastic material, they deform and press against the tubes so that they fill the area between the tubes and the grooves, as shown in FIGS. 7B and 7D.

The fluid entered through inlets 650 and 655 may be the same as described with respect to inlets 350 and 355 above. Optionally, only a single fluid inlet is provided for both rings 640 and 645.

When pressed against the tubes, the o-rings block any leakage between the two tubes, such that any leakage, if exists, at connection 615 between the tubes will remain in cavity 630 between the two-rings. A measurement instrument 660 is provided between the two o-rings and can be used to check for any leakage at connection 615. Optionally, vacuum is provided between the two o-rings in order to correctly measure leakage even when seal 600 does not hermetically seal the connection.

As used herein the term "about" and "substantially" refers to ±10%. For example, substantially perpendicular means an angle of between 162°-198° between the elements.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A seal for connecting to a tube having a wall, the seal comprising:
    an elongated cavity for receiving an end of a tube, the elongated cavity comprising a cone-shaped groove having a narrow side facing the tube and a wide side distal to the tube;
    a first elastic ring in the cone-shaped groove of the elongated cavity, wherein the first elastic ring has a circular or elliptical cross section, and wherein a minimum diameter of the circular or elliptical cross section is larger than a minimum distance between the walls of the cone-shaped groove; and
    a fluid inlet distal to the elongated cavity for passing fluid into the cone-shaped groove, thereby:

(a) radially pressing the first elastic ring against the wall of the tube inserted in the elongated cavity, and
(b) deforming the first elastic ring to block the area between the tube and the walls of the elongated cavity;

wherein an angle between walls of the cone-shaped groove is constant from the narrow side to the wide side, and wherein the angle facilitates a release of the first elastic ring when pressure from the fluid inlet is released.

2. The seal according to claim 1, further comprising a second elastic ring surrounding the first elastic ring, wherein said fluid inlet is additionally configured for radially pressing the second elastic ring against the first elastic ring, thereby pressing the first elastic ring against the wall of the tube inserted in the elongated cavity, and wherein, if excess pressure from the fluid inlet tears the second elastic ring, the first elastic ring is left intact and prevents penetration of the pressure into the elongated cavity.

3. The seal according to claim 1, further comprising:
an elongated shaft positioned within the elongated cavity, such that the inserted tube surrounds the shaft;
a second elastic ring around the shaft; and
a second fluid inlet for radially pressing the second elastic ring against the inner surface of the wall of the inserted tube and towards the first elastic ring.

4. The seal according to claim 3, wherein the second elastic ring is positioned in a groove in the elongated shaft, and wherein the second fluid inlet passes fluid from the inlet into the groove in the shaft so as to deform the second elastic ring.

5. The seal according to claim 1, wherein the first elastic ring is an O-ring.

6. The seal according to claim 1, wherein the first elastic ring is made of a material selected from the group consisting of: rubber, silicone, neoprene and polyurethane.

7. The seal according to claim 1, wherein the angle between the walls of the cone-shaped groove is between 5 and 60 degrees.

8. The seal according to claim 1, wherein the first elastic ring has a thickness larger than a maximum difference between a cross-section of the elongated cavity and a cross-section of the tube.

9. The seal according to claim 3, wherein the second elastic ring is thicker than the first elastic ring, thereby providing greater pressure on the first elastic ring.

10. The seal according to claim 3, wherein at least one of the first and second elastic rings is made of a material selected from the group consisting of: rubber, silicone, neoprene and polyurethane.

11. The seal according to claim 3, wherein at least one of the first and second elastic rings is an O-ring.

12. The seal of claim 1, wherein the fluid inlet is configured to remove fluid from the cone-shaped groove, further applying a vacuum to the groove and facilitating the release of the first elastic ring.

* * * * *